US009083591B2

(12) United States Patent
Nishikawa (10) Patent No.: US 9,083,591 B2
(45) Date of Patent: **\*Jul. 14, 2015**

(54) COMMUNICATION APPARATUS AND COMMUNICATION METHOD

(75) Inventor: Nobuyoshi Nishikawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 476 days.

This patent is subject to a terminal disclaimer.

(21) Appl. No.: 13/599,649

(22) Filed: Aug. 30, 2012

(65) Prior Publication Data

US 2013/0188631 A1   Jul. 25, 2013

(30) Foreign Application Priority Data

Jan. 24, 2012   (JP) ................. 2012-011779

(51) Int. Cl.
*H04L 27/28* (2006.01)
*H04L 27/26* (2006.01)

(52) U.S. Cl.
CPC ........ *H04L 27/2615* (2013.01); *H04L 27/2626* (2013.01); *H04L 27/2647* (2013.01)

(58) Field of Classification Search
CPC ....................................................... H04L 27/28
See application file for complete search history.

(56) References Cited

U.S. PATENT DOCUMENTS

| 7,496,028 | B2 * | 2/2009 | Jung et al. ...................... 370/208 |
| 2006/0089822 | A1 * | 4/2006 | Magee et al. ...................... 703/2 |
| 2007/0230600 | A1 * | 10/2007 | Bertrand et al. ............... 375/260 |
| 2008/0075184 | A1 * | 3/2008 | Muharemovic et al. ...... 375/260 |
| 2009/0080500 | A1 * | 3/2009 | Muharemovic et al. ...... 375/146 |
| 2009/0219802 | A1 * | 9/2009 | Han et al. ...................... 370/210 |
| 2011/0249548 | A1 * | 10/2011 | Gaal et al. ...................... 370/206 |
| 2012/0087427 | A1 * | 4/2012 | Noh et al. ...................... 375/260 |
| 2013/0223360 | A1 * | 8/2013 | Tabet et al. ................... 370/329 |

FOREIGN PATENT DOCUMENTS

JP         2006-165781         6/2006

OTHER PUBLICATIONS

Choi et al., "A PRSC selection scheme based on PN code for OFDM PAPR reduction," Intelligent Signal Processing and Communication Systems, IEEE Nov. 2004.*

(Continued)

*Primary Examiner* — Daniel Washburn
*Assistant Examiner* — Berhanu Tadese
(74) *Attorney, Agent, or Firm* — Warner Norcross & Judd LLP (57) ABSTRACT

A modulator generates a modulation signal from an input signal. A serial-parallel converter generates a subcarrier modulation signal from the modulation signal. An inserter inserts a transmission-side data series, generated by multiplying a data series having an autocorrelation property by a predetermined series amplitude coefficient, in a signal for synthesis, generated by multiplying the subcarrier modulation signal by a predetermined signal amplitude coefficient, in such a way that elements in the signal for synthesis and elements in the transmission-side data series are alternately positioned, thereby generating first data. An IFFT unit performs an inverse fast Fourier transformation on the first data. A separator generates a baseband signal based on first half data of an operation result from the IFFT unit. A transmitter generates a transmission signal from the baseband signal, and transmits it to another apparatus via an antenna.

10 Claims, 6 Drawing Sheets

(56) References Cited

OTHER PUBLICATIONS

Ryu et al., "Dummy sequence insertion (DSI) for PAPR reduction in the OFDM communication system," Consumer Electronics, IEEE Transactions on, vol. 50, No. 1, pp. 89,94, Feb. 2004.*

Lee et al., "Modified Dummy Sequence Insertion Method for PAPR Reduction of OFDM Signal," Vehicular Technology Conference, 2007. VTC-2007 Fall. 2007 IEEE 66th, vol., no., pp. 1265,1268, Sep. 30, 2007-Oct. 3, 2007.*

* cited by examiner

COMMUNICATION APPARATUS AND COMMUNICATION METHOD

CROSS REFERENCES TO RELATED APPLICATION

This application claims the benefit of Japanese Patent Application No. 2012-011779, filed on Jan. 24, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in PAPR.

SUMMARY

Accordingly, it is desirable to reduce the PAPR in OFDM communication, and control the degree of reduction in PAPR.

According to a first aspect of the invention, there is provided a communication apparatus for communicating with another apparatus in orthogonal frequency-division multiplexing wireless communication, the communication apparatus comprising:
  a modulator that modulates an input signal using a predetermined modulation scheme, and assigns the modulated input signal to subcarriers with frequency components orthogonal to each other, thereby generating a subcarrier modulation signal;
  an inserter that inserts a transmission-side data series in a signal for synthesis in such a way that elements in the signal for synthesis and elements in the transmission-side data series are alternately positioned, thereby generating first data, the signal for synthesis being generated by multiplying the subcarrier modulation signal by a predetermined signal amplitude coefficient, the transmission-side data series being generated by multiplying a data series which is a set of data whose quantity is equal to a number of the subcarriers and which has an autocorrelation property such that an autocorrelation value with a data series whose data has not been shifted is higher than an autocorrelation value with a data series whose data has been shifted by a predetermined series amplitude coefficient;
  a first transformer that performs an inverse fast Fourier transformation on the first data;
  a separator that separates an operation result from the first transformer into first half data and second half data having elements equal in quantity to elements of the first half data, and generates a baseband signal based on the first half data or the second half data; and
  a transmitter that generates a transmission signal from the baseband signal.

It is preferable that the inserter may generate the first data having odd-numbered elements which are elements of the signal for synthesis and even-numbered elements which are the elements of the transmission-side data series.

It is preferable that the separator may generate the baseband signal based on the first half data of the operation result from the first transformer.

It is preferable that a maximum value of amplitudes of the elements of the transmission-side data series may be greater than a maximum value of amplitudes of the elements of the signal for synthesis.

According to a second aspect of the invention, there is provided a communication apparatus for communicating with another apparatus in orthogonal frequency-division multiplexing wireless communication, the communication apparatus comprising:
  a receiver that receives a transmission signal and generates a baseband signal;
  a serial-parallel converter that performs serial-parallel conversion on the baseband signal to generate a parallel signal;
  a reception-side inserter that inserts a reception-side data series in a zero vector with all elements having values of 0 in such a way that the elements in the zero vector and elements in the reception-side data series are alternately positioned in a predetermined order, thereby generating second data, the reception-side data series being generated by multiplying a data series which is a set of data whose quantity is equal to a number of subcarriers and which has an autocorrelation property such that an autocorrelation value with a data series whose data has not been shifted is higher than an autocorrelation value with a data series whose data has been shifted by a predetermined series amplitude coefficient;
  a second transformer that performs an inverse fast Fourier transformation on the second data;
  an operator that separates an operation result from the second transformer into first half data and second half data having element equal in quantity to elements of the first half data, and generates third data based on the first half data, the second half data and the parallel signal;
  a third transformer that performs a fast Fourier transformation on data having the parallel signal and the third data aligned in predetermined positions;
  an extractor that extracts predetermined elements from an operation result from the third transformer, and divides the predetermined elements by a predetermined signal amplitude coefficient to generate a subcarrier modulation signal; and
  a demodulator that demodulates the subcarrier modulation signal by a predetermined demodulation scheme.

It is preferable that the reception-side inserter may generate the second data having odd-numbered elements which are elements of the zero vector and even-numbered elements which are the elements of the reception-side data series.

It is preferable that the operator may generate the third data by subtracting the first half data of the operation result from the second transformer from the parallel signal and adding the second half data of the operation result from the second transformer to data obtained by the subtraction, and the third transformer performs a fast Fourier transformation on data whose first half elements are the parallel signal and whose second half elements are the third data.

It is preferable that a maximum value of amplitudes of the elements of the reception-side data series may be greater than a value obtained by multiplying a maximum value of amplitudes of the elements of the subcarrier modulation signal by the signal amplitude coefficient.

According to a third aspect of the invention, there is provided a communication method that is executed by a communication apparatus communicating with another apparatus in orthogonal frequency-division multiplexing wireless communication, the communication apparatus method comprising:

a modulation step of modulating an input signal using a predetermined modulation scheme, and assigning the modulated input signal to subcarriers with frequency components orthogonal to each other, thereby generating a subcarrier modulation signal;

an insertion step of inserting a transmission-side data series in a signal for synthesis in such a way that elements in the signal for synthesis and elements in the transmission-side data series are alternately positioned, thereby generating first data, the signal for synthesis being generated by multiplying the subcarrier modulation signal by a predetermined signal amplitude coefficient, the transmission-side data series being generated by multiplying a data series which is a set of data whose quantity is equal to a number of the subcarriers and which has an autocorrelation property such that an autocorrelation value with a data series whose data has not been shifted is higher than an autocorrelation value with a data series whose data has been shifted by a predetermined series amplitude coefficient;

a first transformation step of performing an inverse fast Fourier transformation on the first data;

a separation step of separating an operation result from the first transformation step into first half data and second half data having elements equal in quantity to elements of the first half data, and generating a baseband signal based on the first half data or the second half data; and a transmission step of generating a transmission signal from the baseband signal.

According to a fourth aspect of the invention, there is provided a communication method that is executed by a communication apparatus communicating with another apparatus in orthogonal frequency-division multiplexing wireless communication, the communication apparatus method comprising:

a reception step of receiving a transmission signal and generates a baseband signal;

a serial-parallel conversion step of performing serial-parallel conversion on the baseband signal to generate a parallel signal;

a reception-side insertion step of inserting a reception-side data series in a zero vector with all elements having values of 0 in such a way that the elements in the zero vector and elements in the reception-side data series are alternately positioned in a predetermined order, thereby generating second data, the reception-side data series being generated by multiplying a data series which is a set of data whose quantity is equal to a number of subcarriers and which has an autocorrelation property such that an autocorrelation value with a data series whose data has not been shifted is higher than an autocorrelation value with a data series whose data has been shifted by a predetermined series amplitude coefficient;

a second transformation step of performing an inverse fast Fourier transformation on the second data;

an operation step of separating an operation result from the second transformation step into first half data and second half data having element equal in quantity to elements of the first half data, and generating third data based on the first half data, the second half data and the parallel signal;

a third transformation step of performing a fast Fourier transformation on data having the parallel signal and the third data aligned in predetermined positions;

an extraction step of extracting predetermined elements from an operation result from the third transformation step, and divides the predetermined elements by a predetermined signal amplitude coefficient to generate a subcarrier modulation signal; and a demodulation step of demodulating the subcarrier modulation signal by a predetermined demodulation scheme.

According to the invention, it is possible to reduce the PAPR in OFDM communication, and further control the degree of reduction in PAPR.

BRIEF DESCRIPTION OF THE DRAWINGS

A more complete understanding of this application can be obtained when the following detailed description is considered in conjunction with the following drawings, in which.

DETAILED DESCRIPTION

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter.

Therefore, the embodiment may be configured to perform IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of DFT hereinafter.

Figure 1:
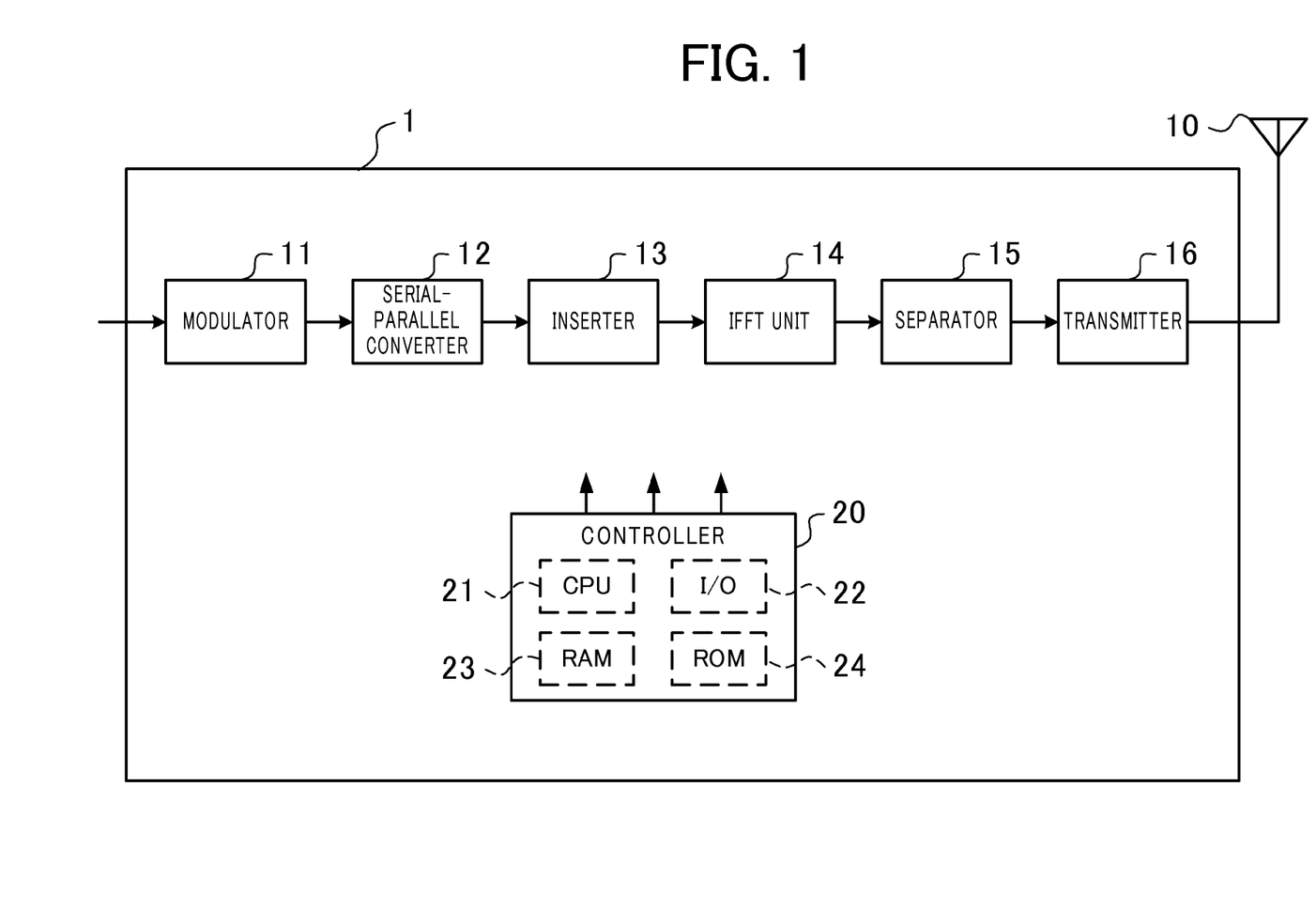
FIG. 1 is a block diagram illustrating a configuration example of a communication apparatus according to an exemplary embodiment of the invention.

FIG. 1 is a block diagram illustrating a configuration example of a communication apparatus 1 according to an exemplary embodiment of the invention. The communication apparatus 1 communicates with another apparatus in OFDM (Orthogonal Frequency-Division Multiplexing) wireless communication. The communication apparatus 1 includes an antenna 10, a modulator 11, a serial-parallel converter 12, an inserter 13, an IFFT unit 14, a separator 15, a transmitter 16, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
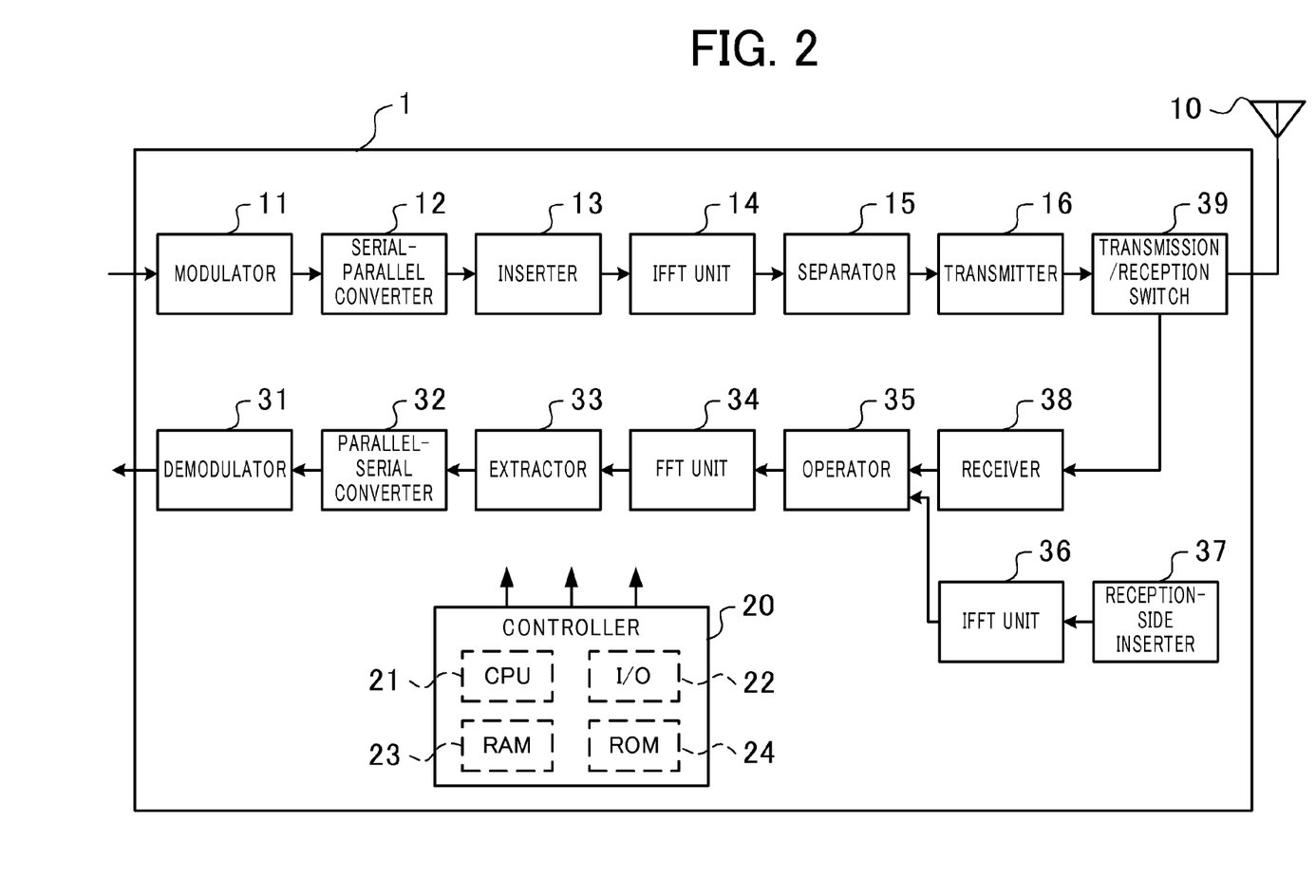
FIG. 2 is a block diagram illustrating a different configuration example of the communication apparatus according to the embodiment.

FIG. 2 is a block diagram illustrating a different configuration example of the communication apparatus 1 according to the embodiment. To provide the communication apparatus 1 with a reception function, the communication apparatus 1 shown in FIG. 2 further includes a demodulator 31, a parallel-serial converter 32, an extractor 33, an FFT unit 34, an operator 35, an IFFT unit 36, a reception-side inserter 37, a receiver 38, and a transmission/reception switch 39. Referring to the communication apparatus 1 shown in FIG. 2 which has the transmission function and the reception function, a communication method which is carried out by the communication apparatus 1 will be described hereinbelow.

The modulator 11 modulates an input signal by a predetermined modulation scheme to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the inserter 13.

The inserter 13 generates a signal for synthesis by multiplying the subcarrier modulation signal by a predetermined signal amplitude coefficient. The inserter 13 inserts a transmission-side data series, which is generated by multiplying a data series having an autocorrelation property by a predetermined series amplitude coefficient, in the signal for synthesis in such a way that elements in the signal for synthesis and elements in the transmission-side data series are alternately positioned, thereby generating first data. The data series having an autocorrelation property is such a data series that the autocorrelation value with a data series whose data has not been shifted is higher than the autocorrelation value with a data series whose data has been shifted arbitrarily. The data series whose data has been shifted arbitrarily differs from the data series whose data has not been shifted in the value of at least one element. A CAZAC (Constant Amplitude Zero Auto-Correlation) sequence, for example, can be used as such a data series. A predetermined signal amplitude coefficient and a predetermined series amplitude coefficient are, as will be described later, real numbers which are determined beforehand to reduce the PAPR.

Given that N is the number of subcarriers, a subcarrier modulation signal $d^{(N)}$ is expressed by the following equation (1). The superscript of the subcarrier modulation signal $d^{(N)}$ represents the number of elements. The same is applied to the following description. Given that the value of the signal amplitude coefficient is "1" for the sake of simplicity, a signal for synthesis is also expressed by the following equation (1).

[Eq. 1]

$$d^{(N)} = \begin{bmatrix} d_0 \\ d_1 \\ \vdots \\ d_{N-1} \end{bmatrix} \quad (1)$$

A transmission-side data series obtained by multiplying a CAZAC sequence $c^{(N)}$ by a predetermined series amplitude coefficient a is expressed by the following equation (2).

[Eq. 2]

$$a \cdot c^{(N)} = \begin{bmatrix} a \cdot c_0 \\ a \cdot c_1 \\ \vdots \\ a \cdot c_{N-1} \end{bmatrix} \quad (2)$$

The inserter 13 sequentially inserts the transmission-side data series in the signal for synthesis without changing the orders of, for example, the elements in the signal for synthesis and the elements in the transmission-side data series to thereby generate first data whose odd-numbered elements are the elements of the signal for synthesis and whose even-numbered elements are the elements of the transmission-side data series. When elements in the first data are aligned vertically from top to down, an odd-numbered element is equivalent to an element in an odd-numbered row, and an even-numbered element is equivalent to an element in an even-numbered row. When elements in the first data are aligned horizontally from left to right as another example, an odd-numbered element is equivalent to an element in an odd-numbered column, and an even-numbered element is equivalent to an element in an even-numbered column. First data $d'^{(2N)}$ whose odd-numbered elements are the elements in the equation (1), and even-numbered elements are the elements in the equation (2) is expressed by the following equation (3).

[Eq. 3]

$$d'^{(2N)} = \begin{bmatrix} d_0 \\ a \cdot c_0 \\ d_1 \\ a \cdot c_1 \\ \vdots \\ d_{N-2} \\ a \cdot c_{N-2} \\ d_{N-1} \\ a \cdot c_{N-1} \end{bmatrix} \quad (3)$$

The inserter 13 sends the first data $d'^{(2N)}$ to the IFFT unit 14. The IFFT unit 14 performs an IFFT on the first data $d'^{(2N)}$. The result, $u^{(2N)}$, of the operation performed by the IFFT unit 14 is expressed by the following equation (4) where $F_{2N}^{-1}$ is a matrix indicating an IFFT. The IFFT unit 14 sends the operation result $u^{(2N)}$ to the separator 15.

[Eq. 4]

$$u^{(2N)} = F_{2N}^{-1} \cdot d'^{(2N)} = \begin{bmatrix} u_0 \\ u_1 \\ \vdots \\ u_{2N-1} \end{bmatrix} \quad (4)$$

The separator 15 bisects the operation result $u^{(2N)}$ into first half data and second half data having elements equal in quantity to elements of the first half data, and generates a baseband signal based on the first half data or the second half data of the operation result $u^{(2N)}$. The "first half data" is data having half the elements of the operation result $u^{(2N)}$ from the first element to the Nth element extracted in order from the operation result $u^{(2N)}$. The "second half data" is the remaining data which has not been extracted as the first half data, i.e., data the N+1th element to the 2Nth element extracted in order from the operation result $u^{(2N)}$. When the operation result $u^{(2N)}$ is aligned vertically as in the equation (4), the first half data is equivalent to the upper half data of the operation result $u^{(2N)}$, and the second half data is equivalent to the lower half data of the operation result $u^{(2N)}$. Thus, the first half data of the operation result $u^{(2N)}$ is referred to as "upper half data", and the second half data of the operation result $u^{(2N)}$ is referred to as "lower half data" of the operation result $u^{(2N)}$. The operation result $u^{(2N)}$ is separated into upper half data $u_{upper}^{(N)}$ and lower half data $u_{lower}^{(N)}$ as expressed by the following equation (5). The separator 15 generates the baseband signal based on, for example, the upper half data $u_{upper}^{(N)}$ of the operation result $u^{(2N)}$.

[Eq. 5]

$$u_{upper}^{(N)} = \begin{bmatrix} u_0 \\ \vdots \\ u_{N-1} \end{bmatrix} \quad (5)$$

$$u_{lower}^{(N)} = \begin{bmatrix} u_N \\ \vdots \\ u_{2N-1} \end{bmatrix}$$

The separator 15 sends the generated baseband signal to the transmitter 16. The transmitter 16 generates a transmission signal from the baseband signal, and transmits the transmission signal to another apparatus via the transmission/reception switch 39 and the antenna 10.

Figure 3A:
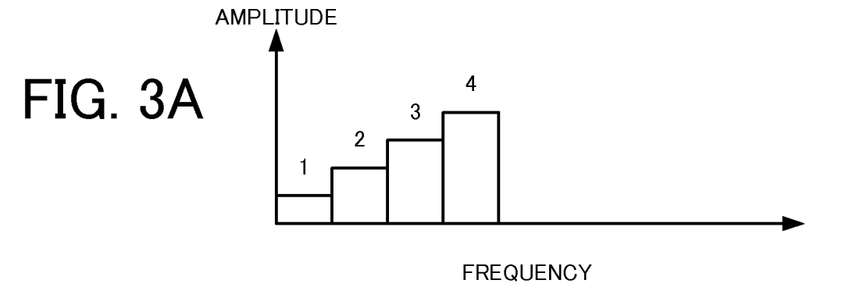
FIGS. 3A to 3D are diagrams illustrating the principle of reducing the PAPR using the communication apparatus according to the embodiment.
Figure 3B:
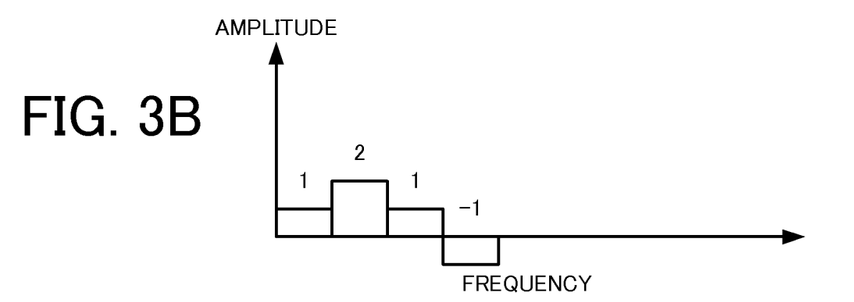
Figure 3C:
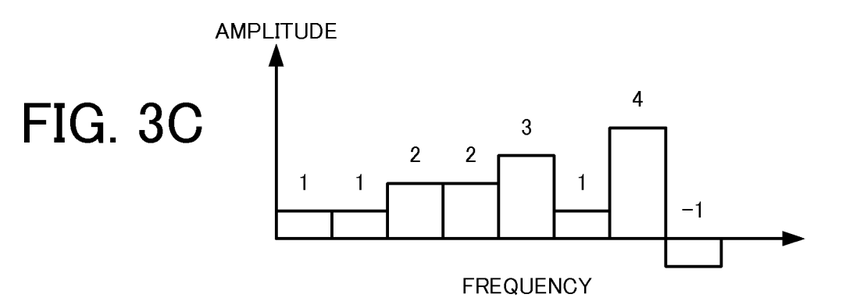
Figure 3D:
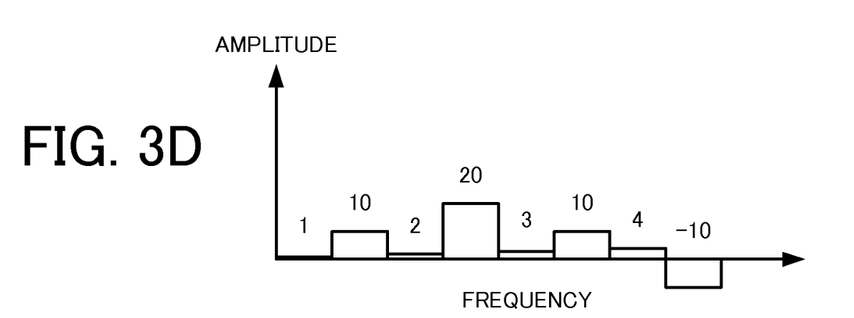

The principle of reducing the PAPR (Peak-to-Average Power Ratio) through the foregoing operation will be illustrated. FIGS. 3A to 3D are diagrams illustrating the principle of reducing the PAPR using the communication apparatus according to the embodiment. The abscissa in each of the diagrams represents the frequency (unit: subcarrier interval $f_0$), and the ordinate represents the amplitude. FIG. 3A shows a signal for synthesis. FIG. 3B shows a data series. FIG. 3C shows first data whose odd-numbered element is a signal for synthesis and whose even-numbered element is a data series when the series amplitude coefficient a is 1. FIG. 3D shows first data whose odd-numbered element is a signal for synthesis and whose even-numbered element is a data series when the series amplitude coefficient a is 10. Numerals on bar charts in FIGS. 3A to 3D represent the amplitudes at individual frequencies.

The PAPR of the signal generated by performing the IFFT in FIG. 3A is 5.2288 dB. The PAPR of the signal generated by performing the IFFT in FIG. 3B is 1.0914 dB. The PAPR of the upper half data of the operation result obtained by performing the IFFT in FIG. 3C is 5.1188 dB. The PAPR of the upper half data of the operation result obtained by performing the IFFT in FIG. 3D is 2.5964 dB.

Therefore, it is possible to reduce the PAPR of the baseband signal by inserting a transmission-side data series, generated by multiplying a data series having an autocorrelation property by a series amplitude coefficient, into a signal for synthesis, generated by multiplying the subcarrier modulation signal by a signal amplitude coefficient. As shown in FIGS. 3C and 3D, the value of the PAPR is changed by varying the values of the signal amplitude coefficient and the series amplitude coefficient. As shown in FIG. 3D, the PAPR is reduced more when the maximum value of the amplitudes of the elements of the transmission-side data series becomes greater than the maximum value of the amplitudes of the elements of the signal for synthesis. The communication apparatus 1 according to the embodiment has a predetermined signal amplitude coefficient and a predetermined series amplitude coefficient determined beforehand so as to reduce the PAPR. As mentioned above, the communication apparatus 1 generates a baseband signal from the upper half data or the lower half data of the operation result and transmits a signal with the same sequence length as that of the related art which ensures reduction of the PAPR, so that the same amplifier as used in the related art can also be used.

The processing on the reception side will be described below. The receiver 38 receives a transmission signal via the antenna 10 and the transmission/reception switch 39, and generates a baseband signal. The receiver 38 sends the generated baseband signal to the operator 35.

The reception-side inserter 37 generates second data by inserting a reception-side data series, generated by multiplying a predetermined data series which is a set of data whose quantity is equal to the number of subcarriers and which has an autocorrelation property by a predetermined series amplitude coefficient, in a zero vector all of whose elements have values of 0 in such a way that the elements in the zero vector and the elements in the reception-side data series are alternately positioned in a predetermined order.

The predetermined data series is the same data series as used on the transmission side, and the predetermined series amplitude coefficient is likewise the same series amplitude coefficient as used on the transmission side. Thus, the transmission-side data series matches with the reception-side data series. The alternate positioning in a predetermined order means that the elements in the zero vector in the second data and the elements in the reception-side data series are alternately positioned so that the positions of the individual elements in the transmission-side data series in the first data generated on the transmission side match with the positions of the same elements in the reception-side data series in the second data as those of the transmission-side data series. Pieces of information on the predetermined data series, the predetermined series amplitude coefficient and the predetermined order are held on the reception side beforehand.

The reception-side inserter 37 sequentially inserts the reception-side data series in the zero vector without changing the orders of, for example, the elements in the reception-side data series to thereby generate second data whose odd-numbered elements are the elements of the zero vector and whose even-numbered elements are the elements of the reception-side data series expressed by the equation (2). The second data, $0'^{(2N)}$, is expressed by the following equation (6).

[Eq. 6]

$$0'^{(2N)} = \begin{bmatrix} 0 \\ a \cdot c_0 \\ 0 \\ a \cdot c_1 \\ \vdots \\ 0 \\ a \cdot c_{N-2} \\ 0 \\ a \cdot c_{N-1} \end{bmatrix} \quad (6)$$

The reception-side inserter 37 sends the second data $0'^{(2N)}$ to the IFFT unit 36. The IFFT unit 36 performs an IFFT on the second data $0'^{(2N)}$. An operation result $v^{(2N)}$ from the IFFT unit 36 is expressed by the following equation (7). The IFFT unit 36 sends the operation result $v^{(2N)}$ to the operator 35.

[Eq. 7]

$$v^{(2N)} = F_{2N}^{-1} \cdot 0'^{(2N)} = \begin{bmatrix} v_0 \\ v_1 \\ \vdots \\ v_{2N-1} \end{bmatrix} \quad (7)$$

The operator 35 performs serial-parallel conversion on the baseband signal to generate a parallel signal. Further, the operator 35 equally divides the received operation result $v^{(2N)}$ into two parts to generate upper half data $v_{upper}^{(N)}$ and lower half data $v_{lower}^{(N)}$ of the operation result $v^{(2N)}$ as expressed by the following equation (8), as done in the separation performed by the transmission-side separator 15.

[Eq. 8]

$$v_{upper}^{(N)} = \begin{bmatrix} v_0 \\ \vdots \\ v_{N-1} \end{bmatrix} \quad (8)$$

$$v_{lower}^{(N)} = \begin{bmatrix} v_N \\ \vdots \\ v_{2N-1} \end{bmatrix}$$

The operator 35 performs a predetermined operation based on the parallel signal, and the upper half data $v_{upper}^{(N)}$ and lower half data $v_{lower}^{(N)}$ of the operation result $v^{(2N)}$, thereby generating third data. The predetermined operation is to generate the third data which is included in the data generated by bisecting the operation result from the IFFT unit 14 on the transmission side and which is not included in the baseband signal. When the elements of the odd-numbered rows of the first data generated on the transmission side are the elements in the signal for synthesis, the elements of the even-numbered rows of the first data are the elements in the transmission-side data series, and the baseband signal is generated based on the upper half data $u_{upper}^{(N)}$ of the operation result from the IFFT unit 14, and is transmitted, as in the above-described example, the operator 35 generates third data $r_{lower}^{(N)}$ as expressed by the following equation (9) where $r_{upper}^{(N)}$ is the parallel signal and matches with $u_{upper}^{(N)}$.

[Eq. 9]

$$r_{lower}^{(N)} = r_{upper}^{(N)} - v_{upper}^{(N)} + v_{lower}^{(N)} \quad (9)$$

In each odd-numbered column vector in a matrix having a size of 2N and indicating an IFFT, a column vector having elements of first to Nth rows is identical to a column vector having elements of N+1th to 2Nth rows. In each even-numbered column vector in the matrix, a column vector which has elements of first to Nth rows is identical to a column vector which has elements of N+1th to 2Nth rows and whose sign is inverted. Because of such an IFFT property, the third data $r_{lower}^{(N)}$ generated from the equation (9) matches with $u_{lower}^{(N)}$.

The operator 35 generates data having the parallel signal $r_{upper}^{(N)}$ and the third data $r_{lower}^{(N)}$ arranged at predetermined positions. The operator 35 sends the FFT unit 34 data $r^{(2N)}$ whose upper half elements are the parallel signal $r_{upper}^{(N)}$ and whose lower half elements are the third data $r_{lower}^{(N)}$ as expressed by the following equation (10), for example.

[Eq. 10]

$$r^{(2N)} = \begin{bmatrix} r_{upper}^{(N)} \\ r_{lower}^{(N)} \end{bmatrix} \quad (10)$$

The operator 35 may be configured in such a way that upon every reception of a transmission signal, the operator 35 holds previously generated data $v_{upper}^{(N)}$ and data $v_{lower}^{(N)}$ in the memory without generating the data $v_{upper}^{(N)}$ and data $v_{lower}^{(N)}$, and performs the above-described operation based on those data. Alternatively, the communication apparatus 1 may be configured without having the IFFT unit 36 and the reception-side inserter 37 for acquiring the data $v_{upper}^{(N)}$ and the data $v_{lower}^{(N)}$, so as to hold the data $v_{upper}^{(N)}$ and data $v_{lower}^{(N)}$, which are generated by another apparatus, in the memory beforehand, and perform the aforementioned operation based on those data.

The FFT unit 34 performs an FFT on data having the parallel signal $r_{upper}^{(N)}$ and the third data $r_{lower}^{(N)}$ arranged at predetermined positions. In case of the above-described example, the FFT unit 34 performs an FFT on data whose upper half elements are the parallel signal $r_{upper}^{(N)}$ and whose lower half elements are the third data $r_{lower}^{(N)}$. An operation result $s^{(2N)}$ is expressed by the following equation (11).

[Eq. 11]

$$s^{(2N)} = F_{2N} \cdot r^{(2N)} = \begin{bmatrix} s_0 \\ s_1 \\ \vdots \\ s_{2N-1} \end{bmatrix} \quad (11)$$

The FFT unit 34 sends the operation result $s^{(2N)}$ to the extractor 33. The extractor 33 extracts predetermined elements from the operation result $s^{(2N)}$, and divides the predetermined elements by a predetermined signal amplitude coefficient to generate a subcarrier modulation signal. The predetermined elements mean elements located in the first data generated by the transmission-side inserter 13 at positions at which the elements in the signal for synthesis are located. The predetermined signal amplitude coefficient is identical to the signal amplitude coefficient used on the transmission side. In case of the above-described example, the extractor 33 extracts elements in odd-numbered rows, and divides the elements by a signal amplitude coefficient of 1 to generate an operation result $t^{(N)}$ expressed by the following equation (12).

[Eq. 12]

$$t^{(N)} = \begin{bmatrix} s_0 \\ s_2 \\ \vdots \\ s_{2N-4} \\ s_{2N-2} \end{bmatrix} \quad (12)$$

The operation result $t^{(N)}$ matches with the subcarrier modulation signal $d^{(N)}$. The extractor 33 sends the subcarrier modulation signal to the parallel-serial converter 32. The parallel-serial converter 32 performs parallel-serial conversion on the subcarrier modulation signal to generate a serial signal, and sends the generated serial signal to the demodulator 31. The demodulator 31 demodulates the serial signal by a predetermined demodulation scheme. For example, the demodulator 31 performs QPSK demodulation on the serial signal. Accordingly, the input signal modulated by the modulator 11 can be demodulated and output by the demodulator 31.

The communication apparatus 1 performs communication, for example, in the following fashion according to the above-described principle. When the number of subcarriers is 2, a subcarrier modulation signal $d^{(2)}$ is expressed by the following equation (13). Given that the number of signal amplitude coefficients is 1, the signal for synthesis is also expressed by the following equation (13).

[Eq. 13]

$$d^{(2)} = \begin{bmatrix} d_0 \\ d_1 \end{bmatrix} \quad (13)$$

A transmission-side data series obtained by multiplying a CAZAC sequence $c^{(2)}$ by the predetermined series amplitude coefficient a is expressed by the following equation (14).

[Eq. 14]

$$a \cdot c^{(2)} = \begin{bmatrix} a \cdot c_0 \\ a \cdot c_1 \end{bmatrix} \quad (14)$$

The inserter 13 generates first data $d'^{(4)}$ which is expressed by the following equation (15) and whose elements in odd-numbered rows are elements given by the equation (13) and whose elements in even-numbered rows are elements given by the equation (14), and sends the first data $d'^{(4)}$ to the IFFT unit 14. For the sake of descriptive simplicity, the series amplitude coefficient a=1.

[Eq. 15]

$$d'^{(4)} = \begin{bmatrix} d_0 \\ a \cdot c_0 \\ d_1 \\ a \cdot c_1 \end{bmatrix} \quad (15)$$

A matrix having an FFT size of 4 and indicating an IFFT is expressed by the following equation (16).

[Eq. 16]

$$F_4^{-1} = \frac{1}{\sqrt{4}} \begin{bmatrix} 1 & 1 & 1 & 1 \\ 1 & i & -1 & -i \\ 1 & -1 & 1 & -1 \\ 1 & -i & -1 & i \end{bmatrix} \quad (16)$$

The IFFT unit 14 performs an IFFT on the first data $d'^{(4)}$. An operation result $u^{(4)}$ is expressed by the following equation (17). The IFFT unit 14 sends the operation result $u^{(4)}$ to the separator 15.

[Eq. 17]

$$\begin{aligned} u^{(4)} &= F_4^{-1} \cdot d'^{(4)} \\ &= \frac{1}{\sqrt{4}} \begin{bmatrix} 1 & 1 & 1 & 1 \\ 1 & i & -1 & -i \\ 1 & -1 & 1 & -1 \\ 1 & -i & -1 & i \end{bmatrix} \cdot \begin{bmatrix} d_0 \\ c_0 \\ d_1 \\ c_1 \end{bmatrix} \\ &= \frac{1}{\sqrt{4}} \begin{bmatrix} d_0 + c_0 + d_1 + c_1 \\ d_0 + ic_0 - d_1 - ic_1 \\ d_0 - c_0 + d_1 - c_1 \\ d_0 - ic_0 - d_1 + ic_1 \end{bmatrix} \end{aligned} \quad (17)$$

The separator 15 bisects the operation result $u^{(4)}$ expressed by the equation (17), and generates a baseband signal based on upper half data $u_{upper}^{(2)}$, expressed by the following equation (18), of the operation result $u^{(4)}$.

[Eq. 18]

$$u_{upper}^{(2)} = \frac{1}{\sqrt{4}} \begin{bmatrix} d_0 + c_0 + d_1 + c_1 \\ d_0 + ic_0 - d_1 - ic_1 \end{bmatrix} \quad (18)$$

The separator 15 sends the baseband signal to the transmitter 16. The transmitter 16 generates a transmission signal from the baseband signal, and transmits the transmission signal to another apparatus via the transmission/reception switch 39 and the antenna 10. The receiver 38 receives the transmission signal via the antenna 10 and the transmission/reception switch 39, generates a baseband signal, and sends the baseband signal to the operator 35.

The reception-side inserter 37 generates second data $0'^{(4)}$ expressed by the following equation (19). The second data $0'^{(4)}$ has elements in odd-numbered rows which are elements in a zero vector all having values of 0 and elements in even-numbered rows which are elements in a reception-side data series expressed by the equation (14) and having the series amplitude coefficient a=1. The reception-side inserter 37 sends the second data $0'^{(4)}$ to the IFFT unit 36.

[Eq. 19]

$$0'^{(4)} = \begin{bmatrix} 0 \\ c_0 \\ 0 \\ c_1 \end{bmatrix} \quad (19)$$

The IFFT unit 36 performs an IFFT on the second data $0'^{(4)}$. An operation result $v^{(4)}$ is expressed by the following equation (20). The IFFT unit 36 sends the operation result $v^{(4)}$ to the operator 35.

[Eq. 20]

$$v^{(4)} = F_4^{-1} \cdot 0'^{(4)} \qquad (20)$$

$$= \frac{1}{\sqrt{4}} \begin{bmatrix} 1 & 1 & 1 & 1 \\ 1 & i & -1 & -i \\ 1 & -1 & 1 & -1 \\ 1 & -i & -1 & i \end{bmatrix} \cdot \begin{bmatrix} 0 \\ c_0 \\ 0 \\ c_1 \end{bmatrix}$$

$$= \frac{1}{\sqrt{4}} \begin{bmatrix} c_0 + c_1 \\ ic_0 - ic_1 \\ -c_0 - c_1 \\ -ic_0 + ic_1 \end{bmatrix}$$

The operator 35 performs serial-parallel conversion on the baseband signal to generate a parallel signal. Further, the operator 35 bisects the received operation result $v^{(4)}$ into upper half data $v_{upper}^{(2)}$ and lower half data $v_{lower}^{(2)}$, as expressed by the following equation (21).

[Eq. 21]

$$v_{upper}^{(2)} = \frac{1}{\sqrt{4}} \begin{bmatrix} c_0 + c_1 \\ ic_0 - ic_1 \end{bmatrix} \qquad (21)$$

$$v_{lower}^{(2)} = \frac{1}{\sqrt{4}} \begin{bmatrix} -c_0 - c_1 \\ -ic_0 + ic_1 \end{bmatrix}$$

The operator 35 generates third data $r_{lower}^{(2)}$ as expressed by the following equation (22) based on the equation (9).

[Eq. 22]

$$r_{lower}^{(2)} = r_{upper}^{(2)} - v_{upper}^{(2)} + v_{lower}^{(2)} \qquad (22)$$

$$= \frac{1}{\sqrt{4}} \begin{bmatrix} d_0 + c_0 + d_1 + c_1 \\ d_0 + ic_0 - d_1 - ic_1 \end{bmatrix} - \frac{1}{\sqrt{4}} \begin{bmatrix} c_0 + c_1 \\ ic_0 - ic_1 \end{bmatrix} +$$

$$\frac{1}{\sqrt{4}} \begin{bmatrix} -c_0 - c_1 \\ -ic_0 + ic_1 \end{bmatrix}$$

$$= \frac{1}{\sqrt{4}} \begin{bmatrix} d_0 - c_0 + d_1 - c_1 \\ d_0 - ic_0 - d_1 + ic_1 \end{bmatrix}$$

The operator 35 sends the FFT unit 34 data $r^{(4)}$ whose upper half elements are the parallel signal $r_{upper}^{(2)}$ and whose lower half elements are the third data $r_{lower}^{(2)}$ as expressed by the following equation (23).

[Eq. 23]

$$r^{(4)} = \begin{bmatrix} r_{upper}^{(2)} \\ r_{lower}^{(2)} \end{bmatrix} \qquad (23)$$

$$= \frac{1}{\sqrt{4}} \begin{bmatrix} d_0 + c_0 + d_1 + c_1 \\ d_0 + ic_0 - d_1 - ic_1 \\ d_0 - c_0 + d_1 - c_1 \\ d_0 - ic_0 - d_1 + ic_1 \end{bmatrix}$$

A matrix having an FFT size of 4 and indicating an IFFT is expressed by the following equation (24).

[Eq. 24]

$$F_4 = \frac{1}{\sqrt{4}} \begin{bmatrix} 1 & 1 & 1 & 1 \\ 1 & -i & -1 & i \\ 1 & -1 & 1 & -1 \\ 1 & i & -1 & -i \end{bmatrix} \qquad (24)$$

The FFT unit 34 performs an FFT on the data $r^{(4)}$ which is expressed by the equation (23), and whose upper half elements are the parallel signal $r_{upper}^{(2)}$ and whose lower half elements are the third data $r_{lower}^{(2)}$. An operation result $s^{(4)}$ is expressed by the following equation (25).

[Eq. 25]

$$s^{(4)} = F_4 \cdot r^{(4)} \qquad (25)$$

$$= \frac{1}{\sqrt{4}} \begin{bmatrix} 1 & 1 & 1 & 1 \\ 1 & -i & -1 & i \\ 1 & -1 & 1 & -1 \\ 1 & i & -1 & -i \end{bmatrix} \cdot \frac{1}{\sqrt{4}} \begin{bmatrix} d_0 + c_0 + d_1 + c_1 \\ d_0 + ic_0 - d_1 - ic_1 \\ d_0 - c_0 + d_1 - c_1 \\ d_0 - ic_0 - d_1 + ic_1 \end{bmatrix}$$

$$= \begin{bmatrix} d_0 \\ c_0 \\ d_1 \\ c_1 \end{bmatrix}$$

The FFT unit 34 sends the operation result $s^{(4)}$ to the extractor 33. The extractor 33 extracts elements in odd-numbered rows from the operation result $s^{(4)}$, and divides the elements by the signal amplitude coefficient of 1 to generate a subcarrier modulation signal.

The extractor 33 sends the subcarrier modulation signal to the parallel-serial converter 32. The parallel-serial converter 32 performs parallel-serial conversion on the subcarrier modulation signal to generate a serial signal, and sends the generated serial signal to the demodulator 31. The demodulator 31 demodulates the serial signal by a predetermined demodulation scheme.

As described above, the communication apparatus 1 according to the embodiment of the invention can reduce the PAPR in OFDM communication by inserting a data series with a low PAPR in the subcarrier modulation signal. As will be discussed later, the communication apparatus 1 can reduce the PAPR and control the degree of reduction in PAPR.

SPECIFIC EXAMPLES

Next, the advantages of the embodiment of the invention will be described based on the results of simulation. In case of identical input signals having the same data symbols, such as data whose elements are all "0" or "1", or data having "10" or "01" alternately repeated, the phases of the subcarrier modulation signals match with each other in OFDM communication, so that the PAPR of the baseband signal becomes the maximum. The linearity-demanded range of the amplifier can be narrowed by reducing the maximum value of the PAPR.

Simulation was performed on generation of baseband signals using identical input signals, and repetitive calculation of the PAPR according to the related art and the embodiment. The PAPR characteristics according to the related art were compared to the PAPR characteristics according to the embodiment with QPSK used as the modulation scheme and the FFT size being variably set to 4, 8, 16, 32, 64, 128, 256, 512, 1024 and 2048. The related art concerns a method of generating the baseband signal from the subcarrier modulation signal without performing the foregoing operation in the inserter 13. The simulation was conducted on the embodiment with the signal amplitude coefficient different set to 1 and series amplitude coefficients a being variably set to 1, 2 and 3.

Figure 4:
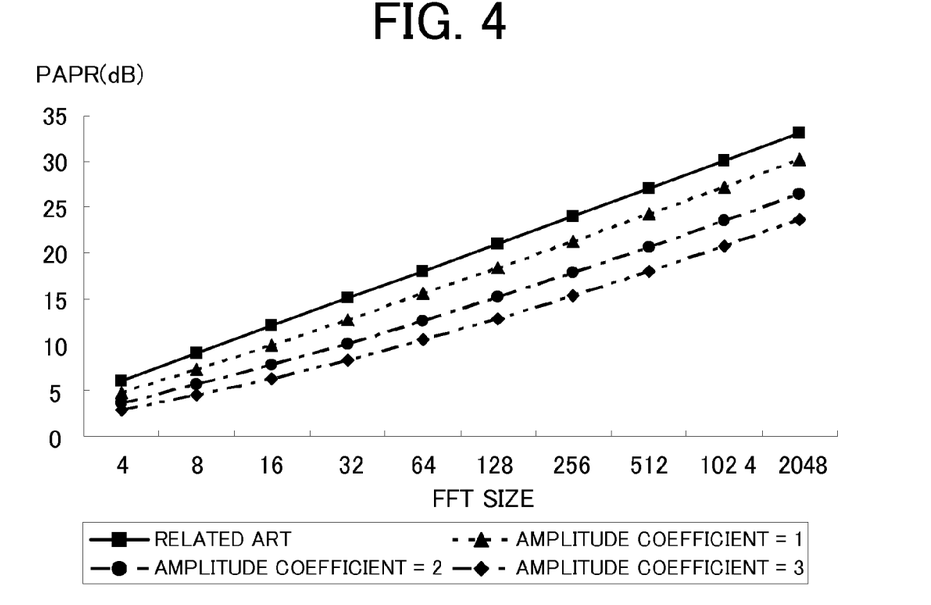
FIG. 4 is a diagram illustrating PAPR characteristics of a baseband signal which are simulated with identical signals.

FIG. 4 is a diagram illustrating the PAPR characteristics of the baseband signal which are simulated with identical signals. The PAPRs according to the related art, the PAPRs with the series amplitude coefficient a=1 according to the embodiment, the PAPRs with the series amplitude coefficient a=2 according to the embodiment, and the PAPRs with the series amplitude coefficient a=3 according to the embodiment were calculated. The average values of the PAPRs for the individual FFT sizes were calculated, and plotted. A solid-line graph showing the plot points by squares represents the PAPR according to the related art. A dotted-line graph showing the plot points by triangles represents the PAPR according to the embodiment with the series amplitude coefficient a=1. A graph of a one-dot chain line showing the plot points by round dots represents the PAPR according to the embodiment with the series amplitude coefficient a=2. A graph of a two-dot chain line showing the plot points by rhomboids represents the PAPR according to the embodiment with the series amplitude coefficient a=3.

The PAPRs according to the embodiment at the individual FFT sizes were reduced as compared to those in the related art. Further, increasing the series amplitude coefficient made the PAPRs lower.

Figure 5:
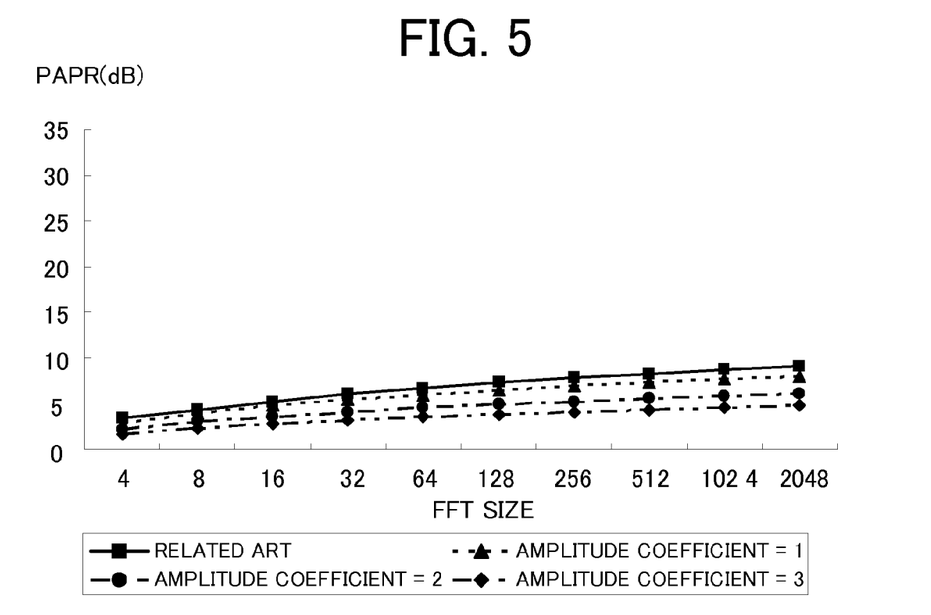
FIG. 5 is a diagram illustrating PAPR characteristics of a baseband signal which are simulated with a random signal.

Similar simulation was conducted using random signals as the input signals. FIG. 5 is a diagram illustrating PAPR characteristics of the baseband signal which are simulated with random signals. The graphs in FIG. 5 are plotted similarly to the graphs in FIG. 4. Even with random input signals, the PAPRs according to the embodiment at the individual FFT sizes were reduced as compared to those in the related art. Further, increasing the series amplitude coefficient made the PAPRs lower.

Next, the baseband signals were generated using QPSK as a predetermined modulation scheme with the FFT size set to 2048 according to the related art and the embodiment, and the CCDF (Complementary Cumulative Distribution Function) of the PAPR, i.e., the characteristic of the probability of occurrence of the PAPR according to the related art were compared to the CCDF of the PAPR according to the embodiment. With regard to the invention according to the embodiment, simulation was performed with the series amplitude coefficient being variably set as done in the aforementioned simulation.

Figure 6:
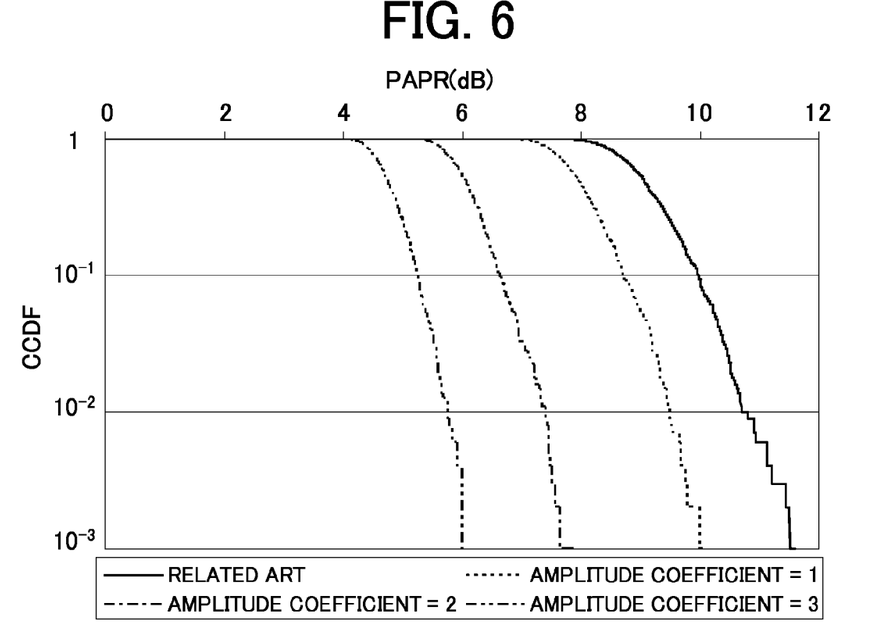
FIG. 6 is a diagram illustrating simulated CCDF characteristics of the PAPRs of baseband signals.

FIG. 6 is a diagram illustrating simulated CCDF characteristics of the PAPRs of baseband signals. The abscissa represents the PAPR (unit: dB), and the ordinate represents the CCDF of the PAPR. A solid-line graph represents the CCDF characteristic of the PAPR according to the related art. A dotted-line graph represents the CCDF characteristic of the PAPR according to the embodiment with the series amplitude coefficient a=1. A graph of a one-dot chain line represents the CCDF characteristic of the PAPR according to the embodiment with the series amplitude coefficient a=2. A graph of a two-dot chain line represents the CCDF characteristic of the PAPR according to the embodiment with the series amplitude coefficient a=3. Within the illustrated range, the PAPR according to the embodiment of the invention was reduced as compared with the PAPR according to the related art, and increasing the series amplitude coefficient made the PAPR lower according to the embodiment.

Figure 7:
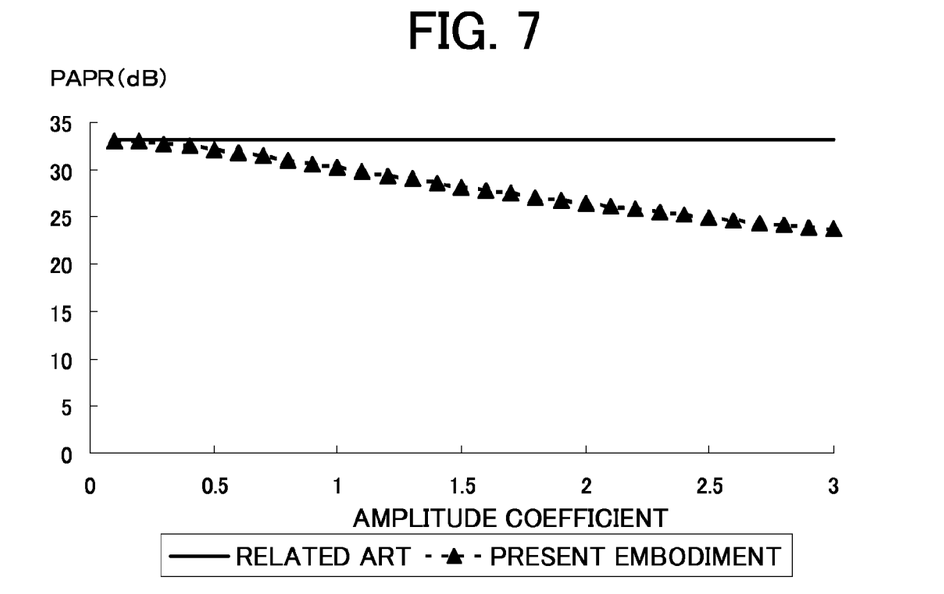
FIG. 7 is a diagram showing the relation between the PAPR of the baseband signal and a series amplitude coefficient which is simulated with identical signals.

Next, simulation was performed on the calculation of the PAPR using QPSK as the modulation scheme with the FFT size set to 2048 and the series amplitude coefficient being variable. FIG. 7 is a diagram showing the relation between the PAPR of the baseband signal and the series amplitude coefficient, which is simulated with identical signals. The PAPRs according to the related art and the PAPRs according to the embodiment were calculated. With regard to the related art, the average values of the PAPRs were calculated and plotted, whereas with regard to the embodiment, the average values of the PAPRs using the individual series amplitude coefficients were calculated and plotted. A solid-line graph represents the PAPR according to the related art. A dotted-line graph showing the plot points by triangles represents the PAPR according to the embodiment. According to the embodiment, increasing the series amplitude coefficient made the PAPR lower.

Figure 8:
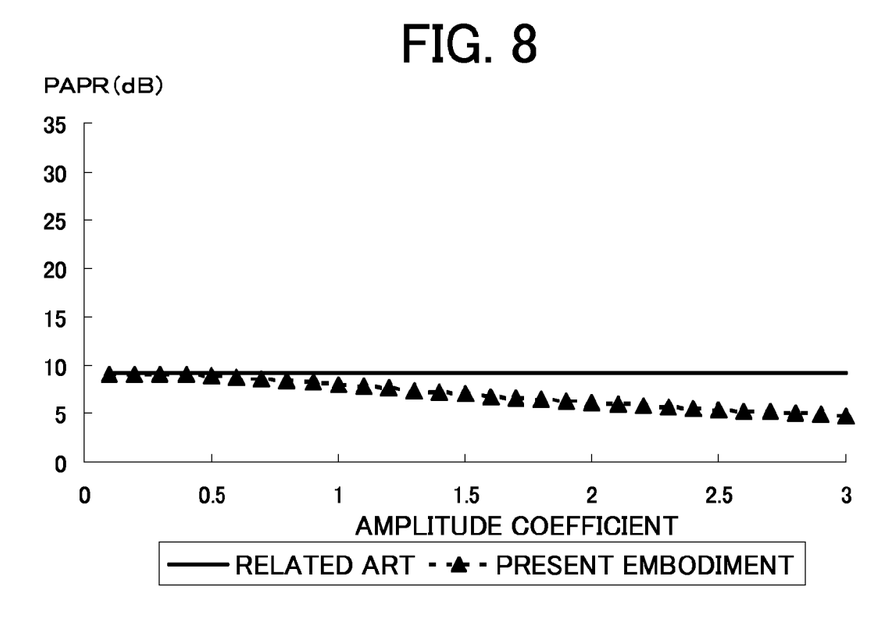
FIG. 8 is a diagram showing the relation between the PAPR of the baseband signal and a series amplitude coefficient which is simulated with random signals.

Similar simulation was conducted using random signals as the input signals. FIG. 8 is a diagram showing the relation between the PAPR of the baseband signal and the series amplitude coefficient, which is simulated with random signals. The graphs in FIG. 8 are plotted similarly to the graphs in FIG. 7. Even with random input signals, increasing the series amplitude coefficient made the PAPRs lower.

Figure 9:
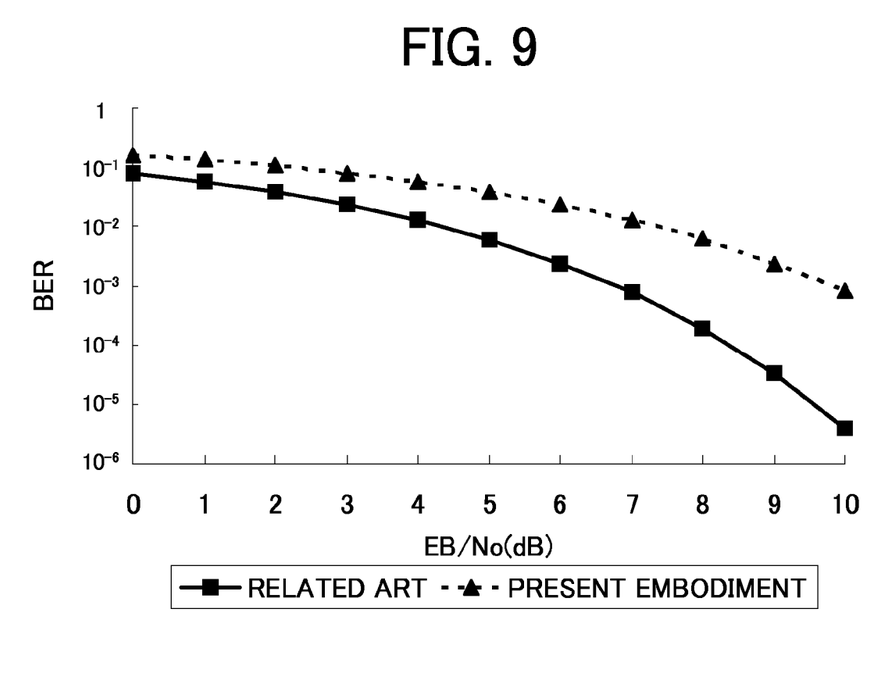
FIG. 9 is a diagram showing simulated BER characteristics.

Next, simulation on the BER (Bit Error Rate) was performed. FIG. 9 is a diagram showing simulated BER characteristics. The abscissa represents the Eb/No (Energy per Bit to NOise power spectral density ratio), and the ordinate represents the BER. The unit of Eb/N is dB. A solid-line graph showing the plot points by squares represents the BER according to the related art. A dotted-line graph showing the plot points by triangles represents the BER according to the embodiment. According to the embodiment, the simulation was performed with the series amplitude coefficient a=1. According to the embodiment, the BER was deteriorated by about 3 dB as compared to that in the related art.

This is because noise increases due to restoration of entire data on the reception side based on the upper half component and the lower half component of the data generated on the transmission side. However, the BER can be improved by increasing the transmission power.

It is apparent from the results of the simulation that the embodiment of the invention can reduce the PAPR by inserting a transmission-side data series, generated by multiplying a data series having an autocorrelation property by a predetermined series amplitude coefficient, in a signal for synthesis generated by the multiplying the subcarrier modulation signal by a predetermined signal amplitude coefficient, and can control the degree of reduction in PAPR by changing the series amplitude coefficient.

The modes of the invention are not limited to the foregoing embodiments. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 31 and the parallel-serial converter 32 being changed.

The inserter 13 may use a PN (Pseudorandom Noise) sequence as a data series. The signal amplitude coefficient is not limited to "1", and the degree of reduction in PAPR control also be controlled by changing the signal amplitude coefficient. For example, even when the signal amplitude coefficient is set to 0.1 and the series amplitude coefficient is set to 1 in FIGS. 3A to 3D, the PAPR can be reduced as in the example shown in FIG. 3D.

The inserter 13 may be configured so as to generate first data $d'^{(2N)}$ whose elements in odd-numbered rows are the elements in the transmission-side data series given by the equation (2) and whose elements in even-numbered rows are the elements in the subcarrier modulation signal given by the equation (1). In this case, when the separator 15 generates the baseband signal based on the upper half data $u_{upper}^{(N)}$ of the operation result $u^{(2N)}$ from the IFFT unit 14, the operator 35 generates third data $r_{lower}^{(N)}$ using the following equation (26) in place of the equation (9) due to the above-described property of an IFFT. Then, the extractor 33 extracts even-numbered elements to generate a subcarrier modulation signal.

[Eq. 26]
$$r_{lower}^{(N)} = -r_{upper}^{(N)} - v_{upper}^{(N)} + v_{lower}^{(N)} \quad (26)$$

The separator 15 may be configured to generate a baseband signal based on the lower half data $u_{lower}^{(N)}$ of the operation result from the IFFT unit 14. In this case, the operator 35 generates parallel signal $r_{upper}^{(N)}$ using the following equation (27) or (28) in place of the equation (9) or (26), respectively. In the equations (27) and (28), $r_{lower}^{(N)}$ is a parallel signal generated by serial-parallel conversion of the baseband signal performed by the operator 35, and matches with $u_{lower}^{(N)}$. Then, the operator 35 sends the FFT unit 34 data $r^{(2N)}$ whose upper half elements are third data $r_{upper}^{(N)}$ and whose lower half elements are the parallel signal $r_{lower}^{(N)}$.

[Eq. 27]
$$r_{upper}^{(N)} = r_{lower}^{(N)} + v_{upper}^{(N)} - v_{lower}^{(N)} \quad (27)$$

[Eq. 28]
$$r_{upper}^{(N)} = -r_{lower}^{(N)} + v_{upper}^{(N)} - v_{lower}^{(N)} \quad (28)$$

The IFFT unit 14, 36 may be configured so as to perform an IDFT instead of an IFFT, and the FFT unit 34 may be configured so as to perform a DFT instead of an FFT.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
a modulator that modulates an input signal using a predetermined modulation scheme, and assigns the modulated input signal to subcarriers with frequency components orthogonal to each other, thereby generating a subcarrier modulation signal;
an inserter that inserts a transmission-side data series in a signal for synthesis in such a way that elements in the signal for synthesis and elements in the transmission-side data series are alternately positioned, thereby generating first data, the signal for synthesis being generated by multiplying the subcarrier modulation signal by a predetermined signal amplitude coefficient, the transmission-side data series being generated by multiplying a data series which is a set of data whose quantity is equal to a number of the subcarriers and which has an autocorrelation property such that an autocorrelation value with a data series whose data has not been shifted is higher than an autocorrelation value with a data series whose data has been shifted by a predetermined series amplitude coefficient;
a first transformer that performs an inverse fast Fourier transformation on the first data;
a separator that separates an operation result from the first transformer into first half data and second half data having elements equal in quantity to elements of the first half data, and generates a baseband signal based on the first half data or the second half data; and
a transmitter that generates a transmission signal from the baseband signal.

2. The communication apparatus according to claim 1, wherein the inserter generates the first data having odd-numbered elements which are elements of the signal for synthesis and even-numbered elements which are the elements of the transmission-side data series.

3. The communication apparatus according to claim 1, wherein the separator generates the baseband signal based on the first half data of the operation result from the first transformer.

4. The communication apparatus according to claim 1, wherein a maximum value of amplitudes of the elements of the transmission-side data series is greater than a maximum value of amplitudes of the elements of the signal for synthesis.

5. A communication apparatus for communicating with another apparatus in orthogonal frequency-division multiplexing wireless communication, the communication apparatus comprising:
a receiver that receives a transmission signal and generates a baseband signal;
a serial-parallel converter that performs serial-parallel conversion on the baseband signal to generate a parallel signal;
a reception-side inserter that inserts a reception-side data series in a zero vector with all elements having values of 0 in such a way that the elements in the zero vector and elements in the reception-side data series are alternately positioned in a predetermined order, thereby generating second data, the reception-side data series being generated by multiplying a data series which is a set of data whose quantity is equal to a number of subcarriers and which has an autocorrelation property such that an autocorrelation value with a data series whose data has not been shifted is higher than an autocorrelation value with a data series whose data has been shifted by a predetermined series amplitude coefficient;
a second transformer that performs an inverse fast Fourier transformation on the second data;
an operator that separates an operation result from the second transformer into first half data and second half data having element equal in quantity to elements of the first half data, and generates third data based on the first half data, the second half data and the parallel signal;
a third transformer that performs a fast Fourier transformation on data having the parallel signal and the third data aligned in predetermined positions;
an extractor that extracts predetermined elements from an operation result from the third transformer, and divides the predetermined elements by a predetermined signal amplitude coefficient to generate a subcarrier modulation signal; and
a demodulator that demodulates the subcarrier modulation signal by a predetermined demodulation scheme.

6. The communication apparatus according to claim 5, wherein the reception-side inserter generates the second data having odd-numbered elements which are elements of the zero vector and even-numbered elements which are the elements of the reception-side data series.

7. The communication apparatus according to claim 5, wherein the operator generates the third data by subtracting the first half data of the operation result from the second transformer from the parallel signal and adding the second half data of the operation result from the second transformer to data obtained by the subtraction, and
the third transformer performs a fast Fourier transformation on data whose first half elements are the parallel signal and whose second half elements are the third data.

8. The communication apparatus according to claim 5, wherein a maximum value of amplitudes of the elements of the reception-side data series is greater than a value obtained by multiplying a maximum value of amplitudes of the elements of the subcarrier modulation signal by the signal amplitude coefficient.

9. A communication method that is executed by a communication apparatus communicating with another apparatus in orthogonal frequency-division multiplexing wireless communication, the communication method comprising:
a modulation step of modulating an input signal using a predetermined modulation scheme, and assigning the modulated input signal to subcarriers with frequency components orthogonal to each other, thereby generating a subcarrier modulation signal;
an insertion step of inserting a transmission-side data series in a signal for synthesis in such a way that elements in the signal for synthesis and elements in the transmission-side data series are alternately positioned, thereby generating first data, the signal for synthesis being generated by multiplying the subcarrier modulation signal by a predetermined signal amplitude coefficient, the transmission-side data series being generated by multiplying a data series which is a set of data whose quantity is equal to a number of the subcarriers and which has an autocorrelation property such that an autocorrelation value with a data series whose data has not been shifted is higher than an autocorrelation value with a data series whose data has been shifted by a predetermined series amplitude coefficient;
a first transformation step of performing an inverse fast Fourier transformation on the first data;
a separation step of separating an operation result from the first transformation step into first half data and second half data having elements equal in quantity to elements of the first half data, and generating a baseband signal based on the first half data or the second half data; and
a transmission step of generating a transmission signal from the baseband signal.

10. A communication method that is executed by a communication apparatus communicating with another apparatus in orthogonal frequency-division multiplexing wireless communication, the communication method comprising:
a reception step of receiving a transmission signal and generates a baseband signal;
a serial-parallel conversion step of performing serial-parallel conversion on the baseband signal to generate a parallel signal;
a reception-side insertion step of inserting a reception-side data series in a zero vector with all elements having values of 0 in such a way that the elements in the zero vector and elements in the reception-side data series are alternately positioned in a predetermined order, thereby generating second data, the reception-side data series being generated by multiplying a data series which is a set of data whose quantity is equal to a number of subcarriers and which has an autocorrelation property such that an autocorrelation value with a data series whose data has not been shifted is higher than an autocorrelation value with a data series whose data has been shifted by a predetermined series amplitude coefficient;
a second transformation step of performing an inverse fast Fourier transformation on the second data;
an operation step of separating an operation result from the second transformation step into first half data and second half data having element equal in quantity to elements of the first half data, and generating third data based on the first half data, the second half data and the parallel signal;
a third transformation step of performing a fast Fourier transformation on data having the parallel signal and the third data aligned in predetermined positions;
an extraction step of extracting predetermined elements from an operation result from the third transformation step, and divides the predetermined elements by a predetermined signal amplitude coefficient to generate a subcarrier modulation signal; and
a demodulation step of demodulating the subcarrier modulation signal by a predetermined demodulation scheme.

* * * * *